United States Patent
Nagar et al.

(10) Patent No.: US 11,146,678 B2
(45) Date of Patent: Oct. 12, 2021

(54) DETERMINING THE CONTEXT OF CALLS

(71) Applicant: INTERNATIONAL BUSINESS MACHINES CORPORATION, Armonk, NY (US)

(72) Inventors: Raghuveer Prasad Nagar, Kota (IN); Manjit Singh Sodhi, Bangalore (IN); Bharat Bhushan Balothia, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/798,593

(22) Filed: Feb. 24, 2020

(65) Prior Publication Data
US 2021/0266402 A1 Aug. 26, 2021

(51) Int. Cl.
*H04M 3/42* (2006.01)
*G06Q 30/00* (2012.01)

(52) U.S. Cl.
CPC ...... *H04M 3/42042* (2013.01); *G06Q 30/016* (2013.01)

(58) Field of Classification Search
CPC ............ H04M 3/42042; H04M 3/436; H04M 3/42059; H04M 3/42102; H04M 3/4211; H04M 2201/41; G06Q 30/016; G06N 7/005; G06N 15/1815; G06N 99/005; G06L 15/1815; G06L 15/265
USPC ............. 379/142.01, 142.04, 142.06, 142.17
See application file for complete search history.

(56) References Cited

U.S. PATENT DOCUMENTS

| | | | |
|---|---|---|---|
| 8,744,062 B2 | 6/2014 | Pickford | |
| 9,129,290 B2 | 9/2015 | Kannan | |
| 9,307,085 B1 | 4/2016 | Hanson | |
| 10,324,979 B2* | 6/2019 | Raanani | G10L 15/183 |
| 10,750,019 B1* | 8/2020 | Petrovykh | G06F 3/04817 |
| 2008/0154609 A1* | 6/2008 | Wasserblat | G10L 17/26 |
| | | | 704/273 |
| 2013/0051545 A1 | 2/2013 | Ross | |
| 2014/0044246 A1 | 2/2014 | Klemm | |
| 2014/0365255 A1 | 12/2014 | Burgess | |
| 2015/0052002 A1* | 2/2015 | Welch | G06F 16/353 |
| | | | 705/26.7 |
| 2016/0196561 A1 | 7/2016 | Iyer | |
| 2017/0134574 A1* | 5/2017 | Winkler | H04M 3/4211 |
| 2017/0149971 A1 | 5/2017 | Klemm | |
| 2018/0174037 A1* | 6/2018 | Henry | G06F 16/325 |
| 2018/0240028 A1* | 8/2018 | Baracaldo Angel | G06N 20/00 |

(Continued)

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Binh Kien Tieu
(74) *Attorney, Agent, or Firm* — James W. Kappos

(57) ABSTRACT

The exemplary embodiments disclose a system and method, a computer program product, and a computer system for determining the context of calls and providing a user interface to a user. The exemplary embodiments may include collecting data from the call, extracting one or more features from the collected data, determining a context of the call based on applying one or more models to the extracted one or more features, and providing a user with a user interface.

14 Claims, 5 Drawing Sheets

(56) References Cited

U.S. PATENT DOCUMENTS

| | | | |
|---|---|---|---|
| 2019/0102739 A1* | 4/2019 | Tseretopoulos | H04L 67/16 |
| 2019/0279164 A1* | 9/2019 | Byron | G06F 16/2457 |
| 2020/0204848 A1* | 6/2020 | Johnson | G08B 27/001 |
| 2020/0311739 A1* | 10/2020 | Chopra | G06F 16/353 |
| 2021/0049487 A1* | 2/2021 | Desouky | G06Q 30/016 |

OTHER PUBLICATIONS

Rothstein, "Amazon Adding Partnerships With Home, Apartment, Hotel Developers to Become Dominant Smart Home Provider", https://www.bisnow.com/national/news/technology/amazon-smart-home-partnerships-hotels-multifamily-developers-99277, Jun. 5, 2019, pp. 1-2.

\* cited by examiner

DETERMINING THE CONTEXT OF CALLS

BACKGROUND

The exemplary embodiments relate generally to call management, and more particularly to determining the context of calls based on call data.

It can be difficult for the recipient of a call to determine the motivation of the caller in calling the recipient. For example, customer service representatives at a corporation may receive phone calls with motivations of seeking set-up information, warranty information, availability, price, etc. about an item or service. It can be very difficult for customer service representatives at corporations to determine the motivation of callers and the context of their calls in order to best serve the caller.

SUMMARY

The exemplary embodiments disclose a system and method, a computer program product, and a computer system for determining the context of calls. The exemplary embodiments may include collecting data from the call, extracting one or more features from the collected data, and determining a context of the call based on applying one or more models to the extracted one or more features.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
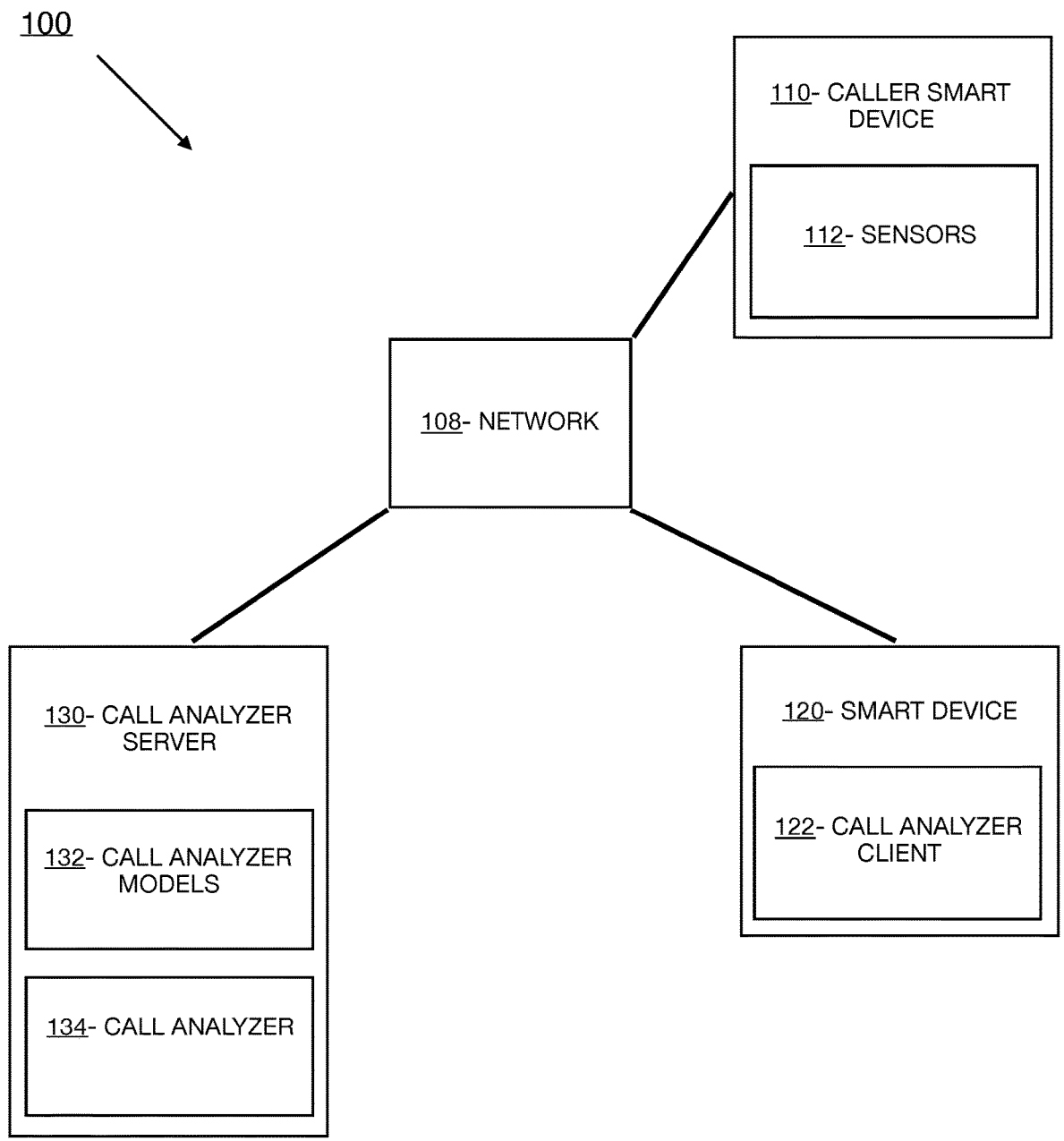
FIG. 1 depicts an exemplary schematic diagram of a call context system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

It can be difficult for the recipient of a call to determine the motivation of the caller in calling the recipient. For example, customer service representatives at a corporation may receive phone calls with motivations of seeking set-up information, warranty information, availability, price, etc. about an item or service. It can be very difficult for customer service representatives at corporations to determine the motivation of callers and the context of their calls in order to best serve the caller. There are many features that need to be considered when determining the context of calls. Accordingly, there is a critical need for a system to account for not only the features, but also the significance of different features in order to determine the context of calls.

Exemplary embodiments are directed to a method, computer program product, and computer system that will determine the context of calls. In embodiments, machine learning may be used to create models capable of determining the context and/or motivation for one or more calls, while feedback loops may improve upon such models. Moreover, data from sensors, the internet, social networks, and user profiles may be utilized to improve context/motivation determination. In embodiments, such calls may refer to phone, internet, video, etc. calls made by an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. The various contexts or motivations for calls may relate to calls made to customer service representatives of corporations, organizations, etc. For example, such calls may be made to a fitness gym inquiring about a fitness machine, made to a public library inquiring about the availability of a book, made to a transportation company inquiring about the schedule of a vehicle, made to a non-profit organization inquiring about volunteer opportunities, etc. In general, it will be appreciated that embodiments described herein may relate to aiding in the determination of the context of a call within any environment and for any motivation.

FIG. 1 depicts the call context system 100, in accordance with the exemplary embodiments. According to the exemplary embodiments, the call context system 100 may include a caller smart device 110, a smart device 120, and a call analyzer server 130, which may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the call context system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the caller smart device 110 includes one or more sensors 112, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the caller smart device 110 is shown as a single device, in other embodiments, the caller smart device 110 may be comprised of a cluster or plurality of computing devices, in a modular manner, etc., working together or working independently. The caller smart device 110 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the one or more sensors 112 may be a camera, microphone, light sensor, infrared sensor, movement detection sensor, pressure sensor, accelerometer, gyroscope, or other sensory hardware/software equipment. In embodiments, the sensors 112 may be integrated with and communicate directly with smart devices such as the caller smart device 110, e.g., smart phones and laptops. Although the sensors 112 are depicted as integrated with the caller smart device 110, in embodiments, the sensors 112 may be external (i.e., standalone devices) connected to the caller smart device 110 or the network 108. In embodiments, the sensors 112 may be incorporated within an environment in which the call context system 100 is implemented. For example, in embodiments, the sensors 112 may be security cameras incorporated into an office space and may communicate via the network 108. The sensors 112 are described in greater detail with respect to FIG. 2-5.

In the example embodiment, the smart device 120 includes a call analyzer client 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 3, as part of a cloud implementation with reference to FIG. 4, and/or as utilizing functional abstraction layers for processing with reference to FIG. 5.

The call analyzer client 122 may be a software and/or hardware application capable of communicating with and providing a user interface for a user to interact with a server via the network 108. The call analyzer client 122 may act as a client in a client-server relationship. Moreover, in the example embodiment, the call analyzer client 122 may be capable of transferring data between the smart device 120 and other devices via the network 108. In embodiments, the call analyzer 134 utilizes various wired and wireless connection protocols for data transmission and exchange, including Bluetooth, 2.4 gHz and 5 gHz internet, near-field communication, Z-Wave, Zigbee, etc. The call analyzer client 122 is described in greater detail with respect to FIG. 2.

In the exemplary embodiments, the call analyzer server 130 includes one or more call analyzer models 132 and a call analyzer 134. The call analyzer server 130 may act as a server in a client-server relationship with the call analyzer client 122, and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the call analyzer server 130 is shown as a single device, in other embodiments, the call analyzer server 130 may be comprised of a cluster or plurality of computing devices, working together or working independently. The call analyzer server 130 is described in greater detail as a hardware implementation with reference to FIG. 3, as part of a cloud implementation with reference to FIG. 4, and/or as utilizing functional abstraction layers for processing with reference to FIG. 5.

The call analyzer models 132 may be one or more algorithms modelling a correlation between one or more call features and a context or motivation of a call. The one or more features may include characteristics relating to a caller, such as a name, username, phone number, IP address, MAC address, web address, email address, geography, employee/student/serial number, a sample audio recording, a sample video recording, caller faceprint, caller voiceprint, caller fingerprint, caller dialogue/content, delay, silence, tone, inflection, background noise, static, purchase history, browsing history, etc., and may be detected and extracted via the one or more sensors 112 and the network 108. In embodiments, the call analyzer models 132 may weight the features based on an effect that the one or more features have on the context of a call. In the example embodiment, the call analyzer 134 may generate the call analyzer models 132 using machine learning methods, such as neural networks, deep learning, hierarchical learning, Gaussian Mixture modelling, Hidden Markov modelling, and K-Means, K-Medoids, or Fuzzy C-Means learning, etc. The call analyzer models 132 are described in greater detail with reference to FIG. 2.

The call analyzer 134 may be a software and/or hardware program capable of receiving a configuration of the call context system 100. In addition, the call analyzer 134 may be further configured for collecting and processing call data. Moreover, the call analyzer 134 may be further configured for extracting features from the data and applying one or more call analyzer models 132 to determine the context of a call. The call analyzer 134 is further capable of arranging one or more user interfaces based on the determination of the context of a call. Lastly, the call analyzer 134 is capable of evaluating the determination of the context of a call, and adjusting its models based on the evaluation. The call analyzer 134 is described in greater detail with reference to FIG. 2.

Figure 2:
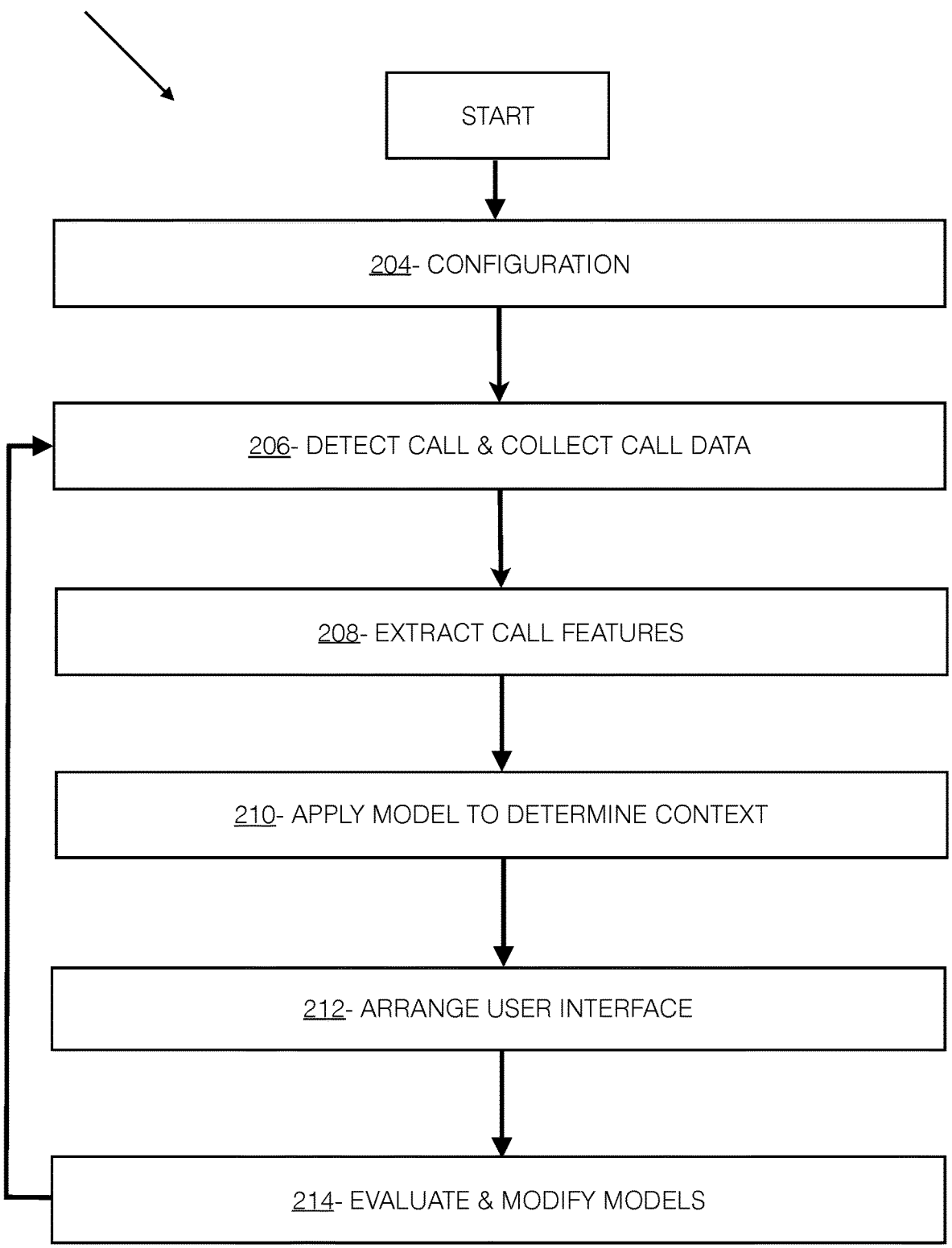
FIG. 2 depicts an exemplary flowchart illustrating the operations of a call analyzer 134 of the call context system 100 in determining the context of one or more calls, in accordance with the exemplary embodiments.

FIG. 2 depicts an exemplary flowchart illustrating the operations of a call analyzer 134 of the call context system 100 in determining the context of a call, in accordance with the exemplary embodiments.

The call analyzer 134 may receive a configuration (step 204). The call analyzer 134 may be configured by receiving information such as a user registration and user preferences. The user registration and user preferences may be uploaded by a user or administrator, i.e., the owner of the smart device 120 or the administrator of smart device 120. For example, the administrator may be an owner/user of the device, a guardian of a minor who uses the device, an employer of a phone-provided employee, etc. In the example embodiment, the configuration may be received by the call analyzer 134 via the call analyzer client 122 and the network 108. Receiving the user registration may involve receiving information such as a name, phone number, email address, account credentials (i.e., telephone account, video-chat/web conference, etc.), company name, serial number, smart device 120 type, and the like. Receiving a user registration may also involve receiving or extracting data from databases such as a user's phone contacts, email contacts, social media contacts, etc. For example, the call analyzer 134 may extract one or more phone numbers, email addresses, usernames, or account credentials associated with one or more friends, co-workers, customers, entities, and other contacts having a relationship with the user. This information may be extracted from, for example, social networks, employee registries/databases, calendars/schedules, etc.

During configuration, the call analyzer 134 may further receive user preferences (step 204 continued). User preferences may include options for predetermined call contexts and/or user interfaces associated with the predetermined call contexts. For example, the call analyzer 134 may receive a user preference for call contexts to include product set-up, maintenance, sales, and returns. The call analyzer 134 may further receive user interface data to provide to the user upon determination of the context of a call, such as information that should be communicated to the caller, web links to information that may be useful to the user in assisting the caller, etc. For example, if the context of a call is "set-up," the call analyzer 134 may prompt the user to ask the caller, "Have you inserted batteries into the device?"

To further illustrate the operations of the call analyzer 134, reference is now made to an illustrative example where a user uploads a user registration along with a link to a corporate contacts database. The user further uploads user preferences with a link specifying call contexts "device set-up," "device maintenance," "sales," and "returns," and user interfaces associated with each call context.

The call analyzer 134 may detect a call and, in response, collect data from the call (step 206). In embodiments, the call analyzer 134 may detect a call via integration of the call analyzer client 122 with the smart device 120 wherein the call is received. Upon receiving a call, the call analyzer 134 may prompt the caller to introduce themselves and/or provide a purpose for the call by playing a recorded or automated audio, video, text, etc. message. The message may be pre-recorded and available by default or personalized by the user. For example, the call analyzer 134 may play a recorded message of the user simply saying, "Hello, how may I assist you today?" In other embodiments, the call analyzer 134 may play a recorded message of the user saying, "Hello, please state your name and reason for calling."

With reference again to the previously introduced example, the call analyzer 134 detects the user receiving a phone call from a caller and prompts the caller with the audio message, "Hello, please state your name and reason for calling."

The call analyzer 134 may extract features from the call (step 208). Such features may be extracted from the audio, video, communication data of the call, and/or databases and may include name, username, phone number, IP address, MAC address, web address, email address, geography, employee/student/serial number, a sample audio recording, a sample video recording, caller faceprint, caller voiceprint, caller fingerprint, caller dialogue/content, delay, silence, tone, inflection, background noise, static, purchase history, browsing history, etc. In order to collect this data, the call analyzer 134 may collect data received by the smart device 120 from the caller via the call analyzer client 122 and the network 108. For example, when receiving voice calls, the program may extract a phone number and corresponding caller name via caller ID functions and/or reverse lookup. In embodiments implementing voice over internet protocol (VOIP) or internet-based communications, the program may extract a username, IP address, MAC address, web address, email address, etc. associated with a device and corresponding caller name via the network 108 and an internet directory. In embodiments, the call analyzer 134 may utilize extracted features to extract further features of a call. For example, the call analyzer 134 may extract the name of a caller based on caller ID functions, and then extract a purchase history, browsing history, etc. based on the extracted name and one or more databases.

In addition to caller phone number, IP address, name, etc., the call analyzer 134 may further extract additional features from the audio and/or video of the call (step 208 continued). In embodiments, the call analyzer 134 may extract features from data collected by the sensors 112. For example, the call analyzer 134 may extract a voiceprint (i.e., spectrogram) of the caller from an audio feed based on the spectrum of frequencies within the caller's voice. In addition, the call analyzer 134 may extract a faceprint of the caller based on facial recognition and image analysis of a video feed. In addition, the call analyzer 134 may extract words and sentences from the call and implement natural language processing, natural language understanding, topic modelling, and other techniques to determine a topic of, transcribe, translate, record, forward, etc. the call. Moreover, the call analyzer 134 may further note silences, delays, tone, inflection, static, background noise, and other features present within the call. For example, the call analyzer 134 may extract a delay based on the absence of dialogue, extract background noise as noise during a delay, and extract silences from the call based on an absence of dialogue or background noise. The call analyzer 134 may further extract tone, inflection, cadence, and other voice characteristics of the caller using audio analysis and processing techniques. In embodiments, the call analyzer 134 may determine that silences, delays, etc. are indicative of a caller pausing to think or attempting to follow instructions for resolving an issue. In embodiments, the call analyzer 134 may determine that an angry tone and/or inflection is indicative of a frustrated caller and likely to be experiencing technical difficulties. In embodiments, the call analyzer 134 may extract features from the call data and/or sensors 112 until the call analyzer 134 determines that the call has ended.

With reference to the example above wherein the user receives the phone call and the call analyzer 134 prompts the user to state their name and purpose, the call analyzer 134 extracts a phone number and name of the caller via caller identification. Moreover, the call analyzer 134 extracts the caller's history of purchase from the user's corporation depicting the purchase of a printer earlier that week. The call analyzer 134 further extracts a voiceprint of the user saying, "I need help setting up my printer" via natural language processing.

The call analyzer 134 may apply one or more models to the extracted features (step 208 continued). In embodiments, the call analyzer 134 may apply the one or more call analyzer models 132 to the extracted features to compute a confidence score as to the context of an incoming call. As previously mentioned, such extracted features may include name, username, phone number, IP address, MAC address, web address, email address, geography, employee/student/serial number, a sample audio recording, a sample video recording, caller faceprint, caller voiceprint, caller fingerprint, caller dialogue/content, delay, silence, tone, inflection, background noise, static, purchase history, browsing history, etc., and the one or more call analyzer models 132 may be generated through machine learning techniques such as neural networks.

Moreover, the call analyzer 134 may weight the extracted features (step 210 continued). In embodiments, the one or more call analyzer models 132 may be trained at initialization and/or through the use of a feedback loop to weight the features such that features shown to have a greater correlation with the correct determination of the context of a call are weighted greater than those features that are not. For example, an incoming call from a number matching that of a customer in a corporate database may be weighted heavily while an incoming call from an unknown phone number may not be weighted. In another example, a caller voiceprint or faceprint matching that of a frequent caller may be weighted heavily while a call having many delays and irrelevant responses to a provided prompt may be weighted lightly due to the likeliness of the call being a nuisance call. In embodiments, the call analyzer models 132 may assign a weight to each extracted feature in order to determine the context of calls.

Based on the weightings assigned by the call analyzer models 132, the call analyzer 134 may determine a feature score for features identified within an incoming call (step 210 continued). For example, the features and weights may be represented by numeric values and the call analyzer 134 may multiply the features by the weights to compute a feature score for each feature extracted from the call. The call analyzer 134 may add, subtract, multiply, or compare the calculated feature scores to feature scores associated with the different call contexts to determine a confidence score for each of the predetermined call contexts. The call analyzer 134 may then determine that the call context with the highest confidence score is the context of the incoming call. In some embodiments, the call analyzer 134 may compare confidence scores for call contexts to a threshold, with confidence scores above the threshold indicative of call contexts and confidence scores below the threshold indicative of incorrect call contexts. For example, the call analyzer 134 may determine that call contexts with confidence scores less than 50 are incorrect call contexts. In embodiments, the call analyzer 134 may be configured alternatively.

With reference again to the previously introduced example where call analyzer 134 has extracted the caller name, phone number, history of purchase, and voiceprint, the call analyzer 134 applies the call analyzer models 132 to the extracted features to compute the highest confidence score of 89 for call context "device set-up," and lower scores of 27 for "device maintenance," 14 for "sales," and 22 for "returns."

The call analyzer 134 may arrange one or more user interfaces (step 212). In the example embodiment, the call analyzer 134 determines the context of an incoming call based on the highest confidence score for a call context. Based on the determined call context for an incoming call, the call analyzer 134 may arrange a suitable user interface for the user. A user interface may include one or more dynamically prepared statements or questions in the form of prompts to a user that may assist the user in properly assisting the caller. A user interface may be in the form of audio, video, text, etc. and may convey information to the user in any manner.

With reference again to the previously introduced example where the call analyzer 134 applies the call analyzer models 132 to the extracted features to compute the highest confidence score of 89 for call context "device set-up," the call analyzer 134 prompts the user with a user interface stating "First, ask customer if they have placed batteries in their device. Second, ask customer if they have turned on their device." The call analyzer 134 also provides the user a link to further information and instructions about the set-up of the caller's printer.

The call analyzer 134 may evaluate and modify the models (step 214). In the example embodiment, the call analyzer 134 may verify whether the context of an incoming call was properly determined in order to provide a feedback loop for modifying the call analyzer models 132. In embodiments, the feedback loop may simply provide a means for a user to indicate whether the call's context was in fact properly determined. For example, the call analyzer 134 may prompt a user to select an option indicative of whether the context of a call was correctly determined. The option may comprise a toggle switch, button, slider, etc. that may be selected by the user or caller manually by hand using a button/touchscreen/etc., by voice, by eye movement, and the like. Based on the call analyzer 134 properly or improperly determining the context of a call, the call analyzer 134 may modify the call analyzer models 132. In other embodiments, the call analyzer 134 may infer or deduce whether the context of a call was properly determined, for example if the user immediately changes to a different template. In some embodiments, the call analyzer 134 may interpret user dialogue via natural language processing to determine whether the context of a call was properly determined. For example, if the caller says "That is not what I am trying to do" or other expressions indicative of a caller's needs not properly being addressed, the call analyzer 134 may infer that the call's context was incorrectly determined and modify the call analyzer models 132 accordingly. Based on feedback received in the above or any other manners, the call analyzer 134 may then modify the call analyzer models 132 to more accurately determine the call context.

With reference again to the previously introduced example where the call analyzer 134 prompts the user with a user interface including text prompts to say to the caller and a link to further information and instructions, the call analyzer 134 prompts the user upon the conclusion of the phone call to indicate whether the user interface was helpful. The user indicates that the user interface was helpful, and the call analyzer 134 adjusts the call analyzer models 132 to more heavily weight the features used in determining the call's context.

Figure 3:
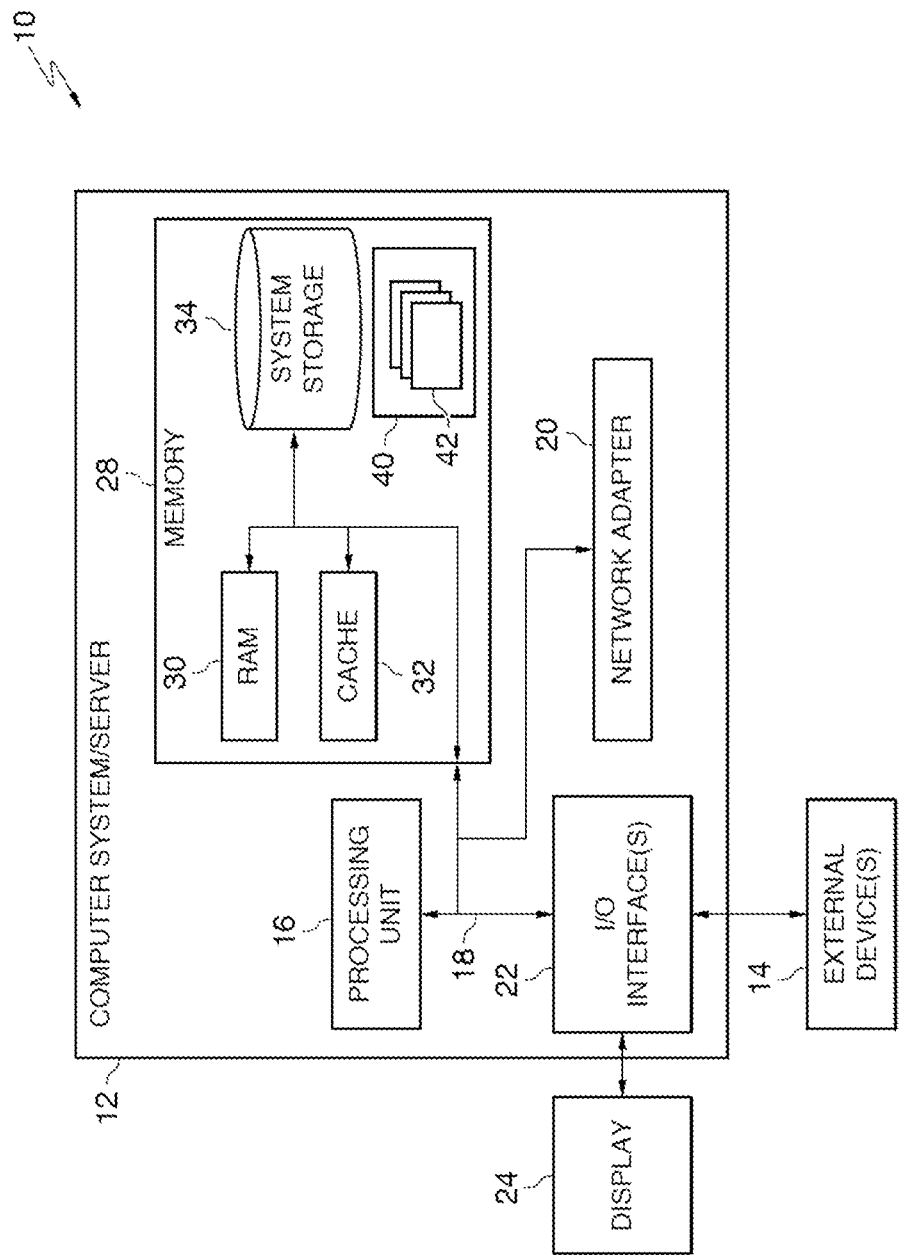
FIG. 3 depicts an exemplary block diagram depicting the hardware components of the call context system 100 of FIG. 1, in accordance with the exemplary embodiments.

FIG. 3 depicts a block diagram of devices within the call analyzer 134 of the call context system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
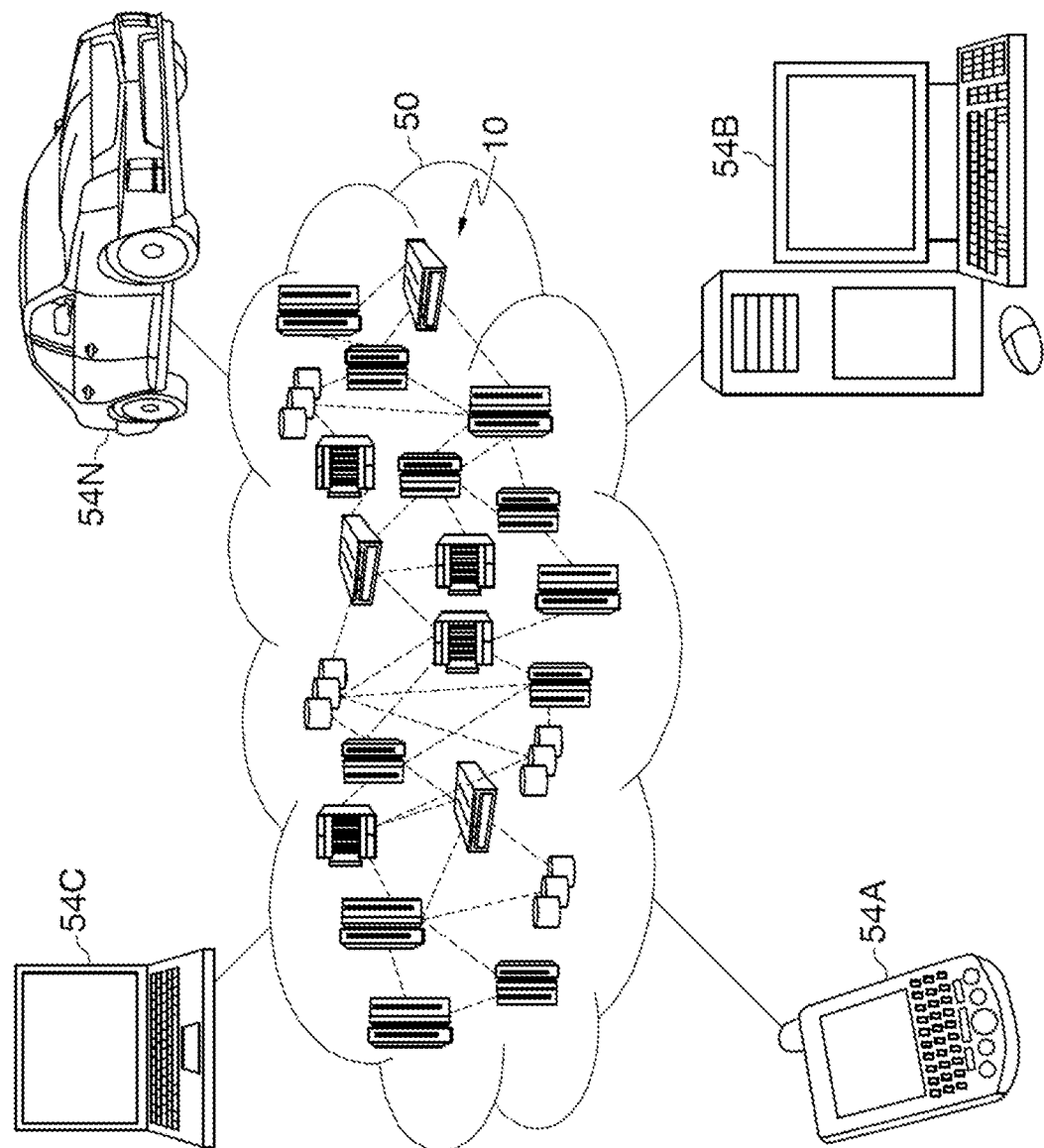
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
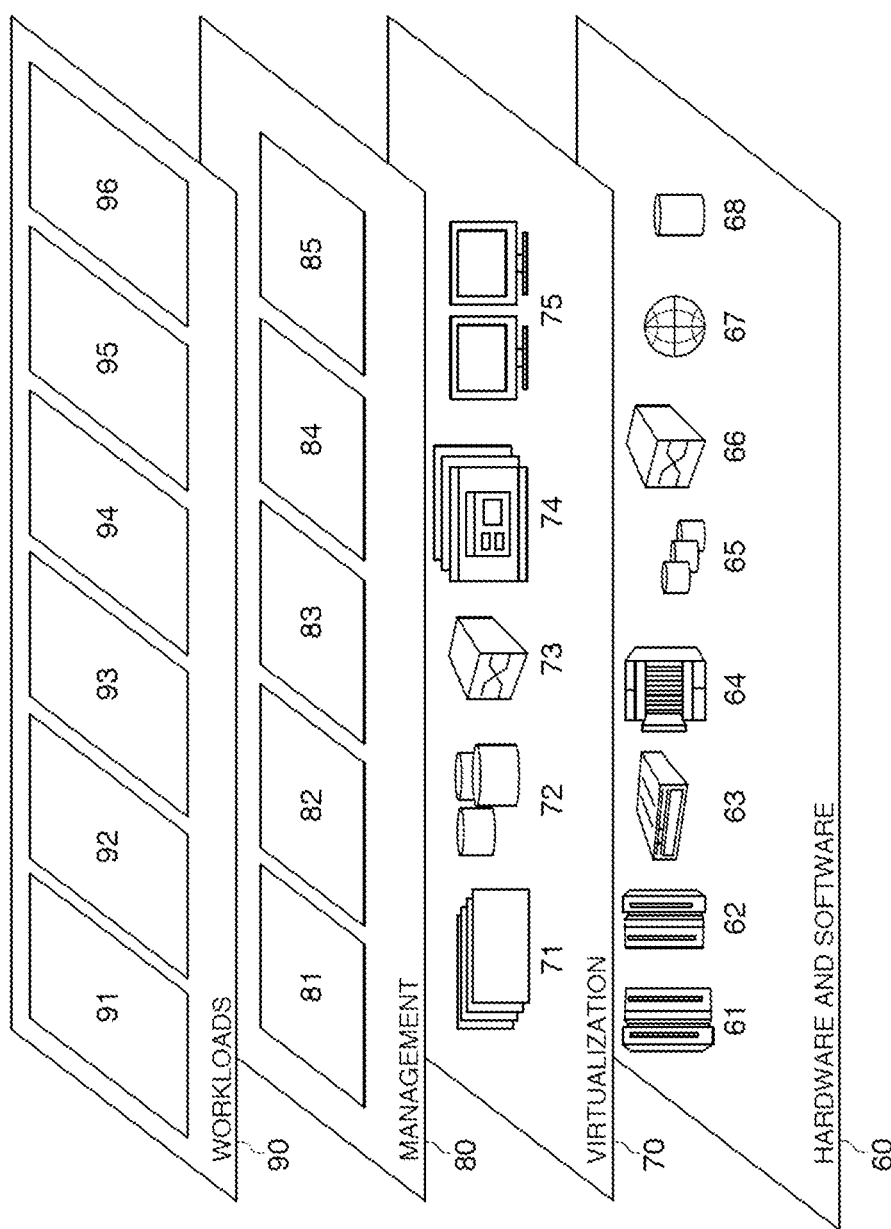
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and call context determination 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method for determining a context of a call, the method comprising:
 collecting data from the call, wherein the collected data includes a purchase history and browsing history of a caller of the call;
 extracting one or more features from the collected data;

determining one or more feature scores by weighting the features such that features shown to have a greater correlation with a correct determination of a context of a call are weighted greater than those features that are not;

determining a context of the call based on applying one or more models to the feature scores; and based on determining the context of the call, providing a recipient of the call with one or more web links, wherein the one or more web links assists the recipient of the call in properly assisting the caller of the call with the determined context of the call.

2. The method of claim 1, wherein the one or more models correlate the one or more features with the context of the call.

3. The method of claim 1, further comprising:
receiving feedback indicative of whether the context of the call was properly identified; and
adjusting the model based on the received feedback.

4. The method of claim 1, further comprising:
prompting the caller of the call to provide identification information.

5. The method of claim 1, wherein the one or more features include features selected from a group comprising a name, username, phone number, IP address, MAC address, web address, email address, geography, employee/student/serial number, a sample audio recording, a sample video recording, caller faceprint, caller voiceprint, caller fingerprint, caller dialogue/content, delay, silence, tone, inflection, background noise, static, purchase history, and browsing history.

6. A computer program product for determining a context of a call, the computer program product comprising:
one or more non-transitory computer-readable storage media and program instructions stored on the one or more non-transitory computer-readable storage media capable of performing a method, the method comprising:
collecting data from the call, wherein the collected data includes a purchase history and browsing history of a caller of the call;
extracting one or more features from the collected data;
determining one or more feature scores by weighting the features such that features shown to have a greater correlation with a correct determination of a context of a call are weighted greater than those features that are not;
determining a context of the call based on applying one or more models to the feature scores; and
based on determining the context of the call, providing a recipient of the call with one or more web links, wherein the one or more web links assists the recipient of the call in properly assisting the caller of the call with the determined context of the call.

7. The computer program product of claim 6, wherein the one or more models correlate the one or more features with the context of the call.

8. The computer program product of claim 6, further comprising:
receiving feedback indicative of whether the context of the call was properly identified; and
adjusting the model based on the received feedback.

9. The computer program product of claim 6, further comprising:
prompting the caller of the call to provide identification information.

10. The computer program product of claim 6, wherein the one or more features include features selected from a group comprising a name, username, phone number, IP address, MAC address, web address, email address, geography, employee/student/serial number, a sample audio recording, a sample video recording, caller faceprint, caller voiceprint, caller fingerprint, caller dialogue/content, delay, silence, tone, inflection, background noise, static, purchase history, and browsing history.

11. A computer system for determining a context of a call, the computer system comprising:
one or more computer processors, one or more computer-readable storage media, and program instructions stored on the one or more of the computer-readable storage media for execution by at least one of the one or more processors capable of performing a method, the method comprising:
collecting data from the call, wherein the collected data includes a purchase history and browsing history of a caller of the call;
extracting one or more features from the collected data;
determining one or more feature scores by weighting the features such that features shown to have a greater correlation with a correct determination of a context of a call are weighted greater than those features that are not;
determining a context of the call based on applying one or more models to the feature scores; and
based on determining the context of the call, providing a recipient of the call with one or more web links, wherein the one or more web links assists the recipient of the call in properly assisting the caller of the call with the determined context of the call.

12. The computer system of claim 11, wherein the one or more models correlate the one or more features with the context of the call.

13. The computer system of claim 11, further comprising:
receiving feedback indicative of whether the context of the call was properly identified; and
adjusting the model based on the received feedback.

14. The computer system of claim 11, further comprising:
prompting the caller of the call to provide identification information.

* * * * *